(12) United States Patent
Schorr et al.

(10) Patent No.: US 7,739,591 B2
(45) Date of Patent: Jun. 15, 2010

(54) STRUCTURING GRAPHICS WITH PLACEHOLDERS

(75) Inventors: Janet L. Schorr, Seattle, WA (US); Crystal L. Hoyer, Redmond, WA (US); Ilan Berker, Seattle, WA (US); Shain Heuer, Hansville, WA (US); Thomas C. Underhill, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/444,114

(22) Filed: May 31, 2006

(65) Prior Publication Data

US 2007/0283284 A1    Dec. 6, 2007

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/23 | (2006.01) |
| G06F 17/24 | (2006.01) |
| G06F 17/26 | (2006.01) |
| G06F 17/27 | (2006.01) |
| G05F 17/28 | (2006.01) |

(52) U.S. Cl. ...................... 715/241; 715/236
(58) Field of Classification Search .............. 715/236, 715/241; 707/101
See application file for complete search history.

(56) References Cited

U.S. PATENT DOCUMENTS

| | | | | |
|---|---|---|---|---|
| 5,617,578 | A * | 4/1997 | Kroll et al. .................. 704/9 |
| 5,798,757 | A | 8/1998 | Smith ......................... 345/338 |
| 5,845,084 | A | 12/1998 | Cordell et al. .......... 395/200.64 |
| 6,456,619 | B1 | 9/2002 | Sassin et al. ................ 370/356 |
| 6,507,812 | B1 | 1/2003 | Meade et al. .................. 704/8 |
| 6,559,871 | B1 | 5/2003 | Brozowski et al. .......... 345/853 |
| 6,718,516 | B1 | 4/2004 | Claussen et al. ............. 715/513 |
| 6,785,865 | B1 | 8/2004 | Cote et al. .................. 715/513 |
| 6,996,781 | B1 * | 2/2006 | Myers et al. ................. 715/763 |
| 2002/0077846 | A1 | 6/2002 | Bierbrauer et al. ............. 705/1 |
| 2003/0052927 | A1 | 3/2003 | Barksdale et al. ............ 345/854 |
| 2003/0218302 | A1 | 11/2003 | Nelson ........................ 273/279 |

(Continued)

FOREIGN PATENT DOCUMENTS

EP    1 536 427    6/2005

OTHER PUBLICATIONS

Microsoft Word 2003, Screenshots Fig 1-7, 2003.*
Microsoft Word 2003, Screenshots Fig 8, 2003.*

(Continued)

*Primary Examiner*—Ting Lee
*Assistant Examiner*—Ashraf Zahr
(74) *Attorney, Agent, or Firm*—Merchant & Gould

(57) ABSTRACT

Structuring graphics with placeholders may be provided. A first diagram may be displayed configured to display data associated with a data model. The first diagram may have a first diagram type. Next, a request may be received to display the data model in a second diagram configured to display the data associated with the data model. The second diagram may have a second diagram type. Then, the second diagram may be displayed configured to show the data associated with the data model.

20 Claims, 5 Drawing Sheets

U.S. PATENT DOCUMENTS

| | | | |
|---|---|---|---|
| 2004/0157193 A1 | 8/2004 | Mejias et al. | 434/118 |
| 2006/0070005 A1* | 3/2006 | Gilbert et al. | 715/763 |
| 2006/0095443 A1* | 5/2006 | Kumar et al. | 707/100 |

OTHER PUBLICATIONS

Millhollon, Mary, Murray Katherine, Microsoft Office Word 2003 Inside Out, Nov. 5, 2003, Microsoft Press, pp. 456-462.*

Charles Morris, "Best Practices: Developing Solutions Using the Content Management Server 2002 Connector for SharePoint Technologies", http://msdn.microsoft.com/library/default.asp?url=/library/en-us/dnmscms02/html/ODC_MCMSCSPT_BPDevelopingSols.asp; Mar. 2004, 15 pgs.

"Setting Up Personalization and Interaction Management", http://e-docs.bea.com/wIp/docs70/dev/p13n.htm; 25 pgs.

* cited by examiner

STRUCTURING GRAPHICS WITH PLACEHOLDERS

BACKGROUND

Single line placeholder text is used to show where text should go in a document. In some situations, placeholder text may be used, for example, to notify users when and what type of text should be added to various locations in the document. For example, data may be entered in a data model having a corresponding diagram including various graphic elements (i.e. areas or shapes.)

Different diagram types may be used and switched between when graphically representing the data model. With conventional systems, however, placeholder text is limited to one placeholder text string per graphic. Thus, the conventional strategy is to limit the placeholder text to one string per graphic and does not support multiple strings in a single graphic. Furthermore, conventional systems do not support structured graphics with image placeholders or adding and pruning leaf nodes from a hierarchical tree when switching between diagram types.

SUMMARY

Structuring graphics with placeholders may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

Structuring graphics with placeholders may be provided. A first diagram may be displayed configured to display data associated with a data model. The first diagram may have a first diagram type. Next, a request may be received to display the data model in a second diagram configured to display the data associated with the data model. The second diagram may have a second diagram type. Then, the second diagram may be displayed configured to show the data associated with the data model.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1A:
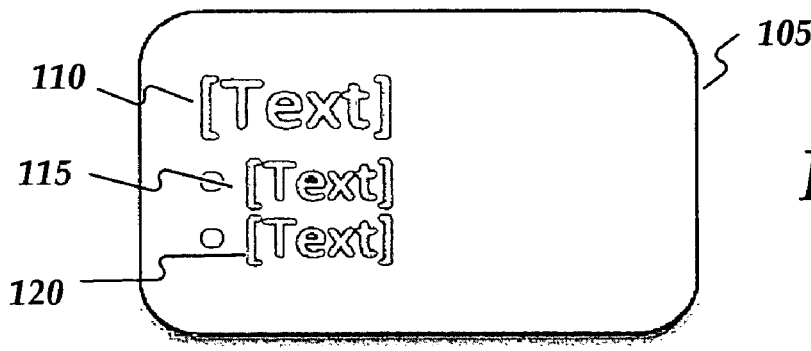
FIGS. 1A through 1C illustrate structured graphics with text placeholders.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1B:
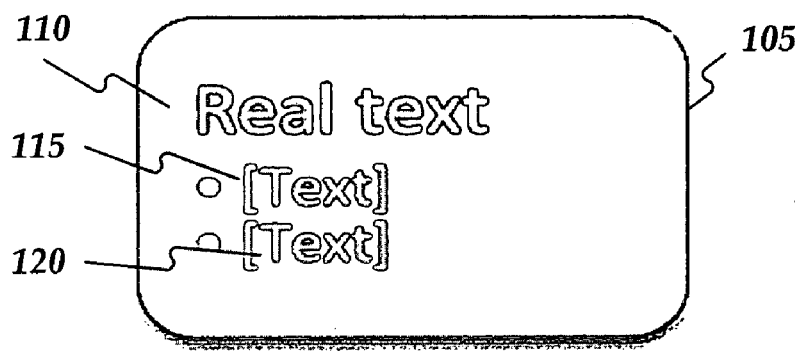
Figure 1C:
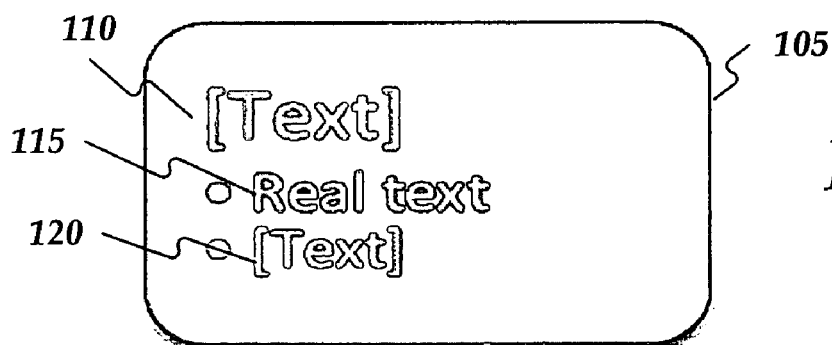

Consistent with embodiments of the present invention, structured graphics with placeholders may be provided with multiple placeholder text strings. For example, placeholder text may be used to notify users when and what type of text should be added to various locations in a document. However, with conventional systems, this placeholder text is usually limited to one string per area/shape (i.e. graphic). Consistent with embodiments of the present invention, multiple strings in a single area/shape may be allowed. For example, a shape 105 shown in FIG. 1A, may indicate that a user may create multiple lines of text. As shown in FIG. 1B, the user may replace placeholder text in a top-level text 110 with real text. Furthermore, a first bulleted-text 115 and a second bulleted-text 120 may remain as placeholder text after the user replaces top-level text 110. Similarly, the user may replace first bullet-text 115 with real text, while top-level text 110 and second bulleted-text 120 remains as placeholder text as shown in FIG. 1C. Because some of the text strings in shape 105 may remain as placeholder text, they can be removed on, for example, a graphic switch, or other places where only placeholder items are modified. Consequently, as discussed below in more detail, embodiments of the invention may support multiple placeholder strings in a single shape, and may allow users to modify one string at a time.

As stated above, embodiments of the invention may provide multiple placeholder text strings. For example, each graphic may have an "ideal" (i.e. sample) data model associated with it. This data model may create a hierarchical list of elements. The hierarchy may preserve the semantic relationship between the elements. One attribute of each element of the sample data model may comprise whether the item contains placeholder text. When the graphic is laid out, shapes may get created and mapped to the data model elements according to a specific pattern specified in a definition. If a shape contains one or more elements with the placeholder text attribute, then a placeholder string for each element may display inside the shape.

When the user clicks on the placeholder string, the string may be removed and the user may be left with a "blank" field to type in their data. If a shape contains multiple placeholder strings, only the currently selected string may be removed. If the user clicks away without typing, the placeholder string may reappear. If the user types, then the placeholder attribute may be cleared from the data model element and that element may no longer be considered to be sample data. Placeholder text may not display when in, for example, a slideshow or reading mode, and may not print. It may only display, for example, in editing mode to assist the user.

Figure 2A:
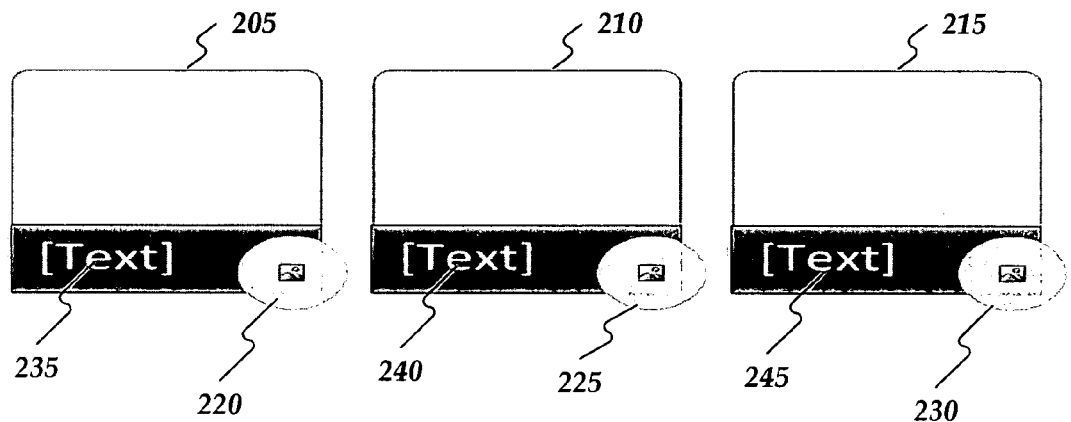
FIGS. 2A through 2B illustrate structured graphics with image placeholders.
Figure 2B:
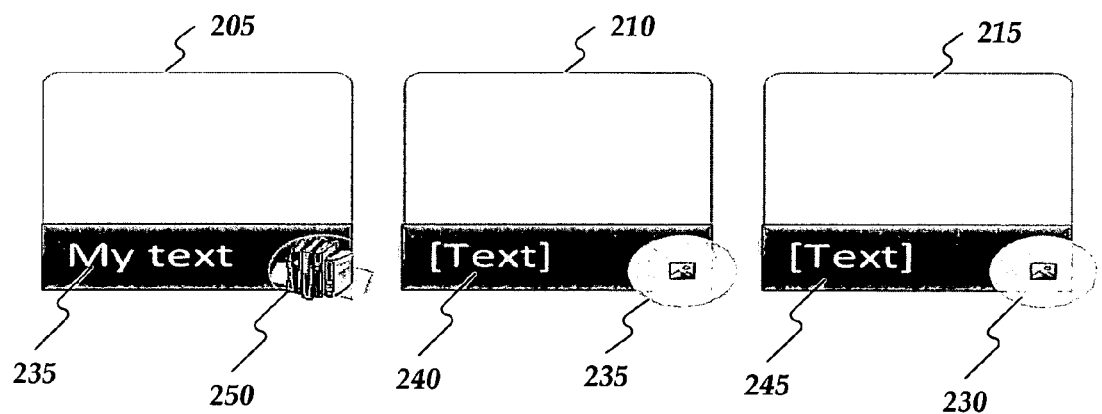

Consistent with another embodiment of the present invention, structured graphics with image placeholders may also be provided. For example, as shown in FIG. 2A, structured graphics 205, 210, and 215 may be designed to contain images in, for example, corresponding circles 220, 225, and 230. For example, an image icon located in any of circles 220, 225, and 230 may indicate that an image may be displayed. However, the image icon may not display in, for example, a slideshow mode or a reading mode, and may not print. Structured graphics 205, 210, and 215 may also include placeholder text 235, 240, and 245. As shown in FIG. 2B, if the user, for example, clicks on an icon 250, an image fill user interface (UI) may display, and the user may proceed to add an image to this location. Also, FIG. 2B shows placeholder text 235 being replaced with real text. Consequently, as discussed below in more detail, embodiments of the invention may support placeholder images working as placeholder strings do.

Image placeholders may indicate shapes in a graphic that are designed to contain images. Rather than inserting an image and requiring the user to change it, the image placeholder may indicate that the shape should/can contain an image. It also may provide a shortcut to shape image fill functionality. Placeholder image icons may not display when in, for example, slideshow or reading mode, and may not print. They may only display in editing mode to assist the user. In the graphic definition, an attribute on a shape indicates that an image placeholder should be placed inside the shape. The placeholder may be created when the graphic layout is created. When the user clicks on the icon, for example, the resulting behavior may be the same as if the user selected the shape, then selected the image fill command. An insert picture dialog box may open.

Consistent with yet another embodiment of the present invention, structured graphics with placeholders may be provided, for example, based on a predetermined set of placeholder shapes. For example, both the structure and the user's data may be maintained when switching between graphics supporting hierarchical and flat data sets. Consequently, as discussed below in more detail, embodiments of the invention may support adding and pruning leaf nodes from a hierarchical tree describing a graphic layout structure.

Figure 3:
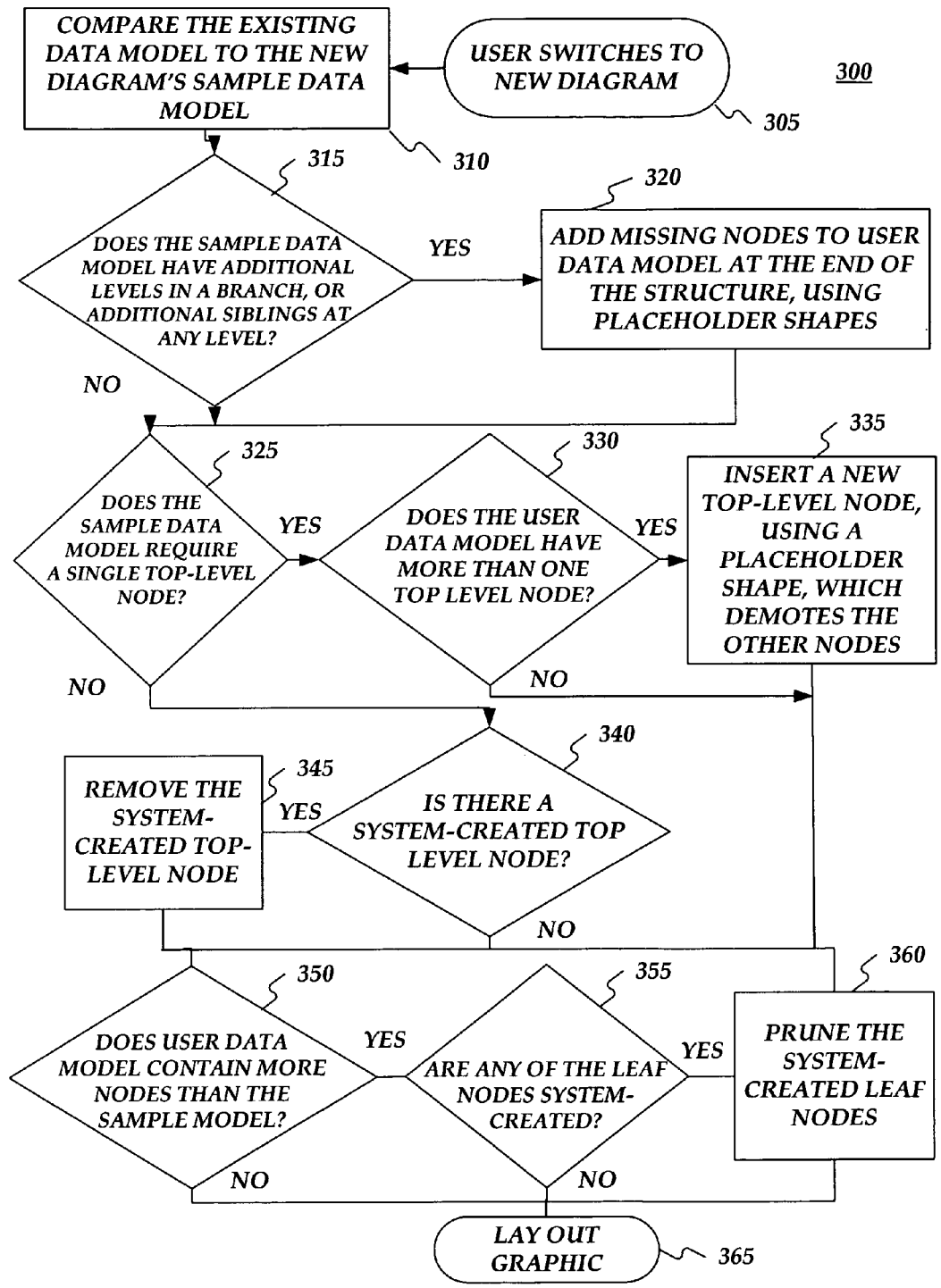
FIG. 3 is a flow chart of a method for structuring graphics with placeholders.

FIG. 3 is a flow chart setting forth the general stages involved in a method 300 consistent with an embodiment of the invention for adding and removing nodes when switching between graphics with separate structures using a computing device 500 of FIG. 5 (as described below.) Ways to implement the stages of method 300 will be described in greater detail below. Method 300 may begin at block 305 where a user may switch to a new diagram from an old diagram. For example, each graphic within the diagram may be associated with a sample data model that reflects an ideal structure for the graphic. Embodiments of the invention, for example, may create a data model for the user that is as close to this ideal data model as possible, while preserving the semantic structure of the user's data model. When the user switches between graphics, for example, the data in the user's graphic may contain appropriate data to display a reasonable graphic. In these situations, the user's data model may remain unchanged. However, there may be situations where adding or removing nodes better reflect the new graphic the user has switched to.

Figure 4A:
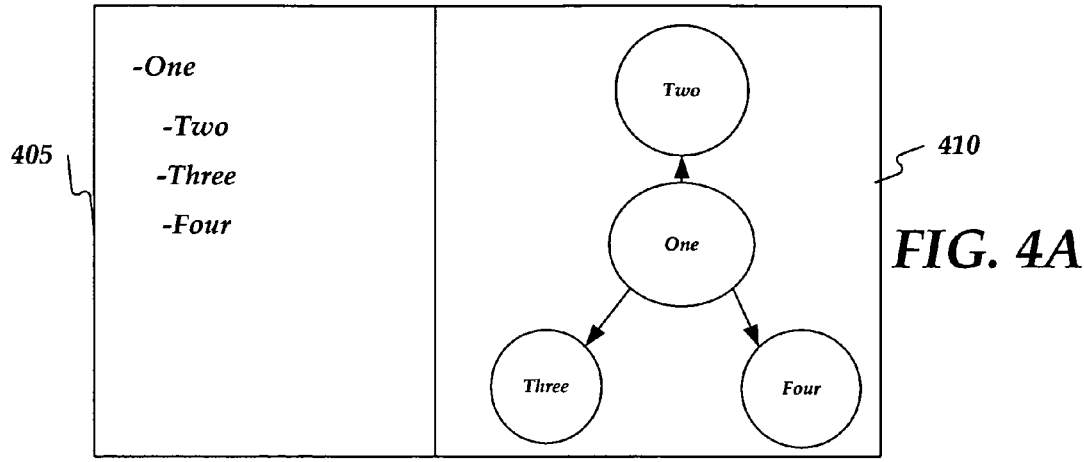
FIGS. 4A through 4C show various data models and their corresponding diagram having various graphics.
Figure 4B:
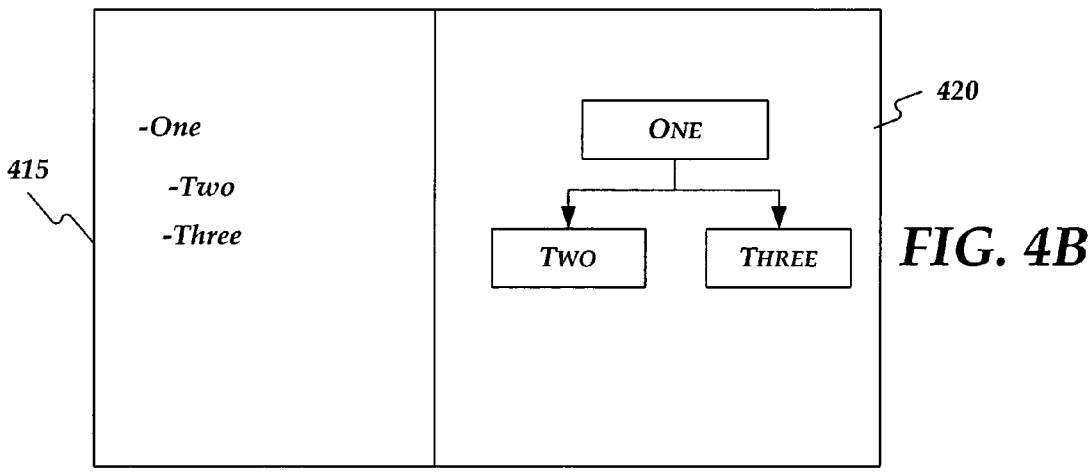
Figure 4C:
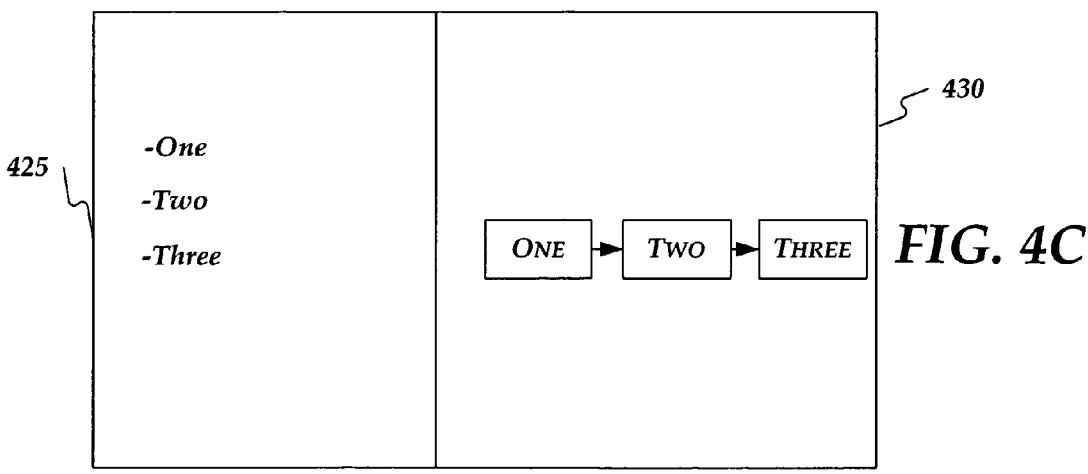

As mentioned above, various data models and their corresponding diagram having various graphics are shown in FIGS. 4A through 4C. For example, FIG. 4A illustrates a radial diagram 410 corresponding to the data model 405. FIG. 4B illustrates a hierarchical diagram 420 corresponding to the data model 415. And FIG. 4C illustrates a flat diagram 430 corresponding to the data model 425. Consistent with embodiments of the invention, a user controlling computing device 500 may switch between various diagrams to represent any given data model. For example, for any given data model, the user can switch the diagram between a radial, a hierarchical diagram, and a flat diagram. The aforementioned diagram types are examples and other diagram types may be used.

Referring back to FIG. 3, if the user has made no changes (stage 310) to the data model and then switches to a new graphic, the current data model may be replaced with one constructed from an active graphic's sample data model. (Stage 315.) A data model may be considered changed, for example, when any semantic element: i) receives user text (e.g. that clears the placeholder text); ii) is customized (e.g. through size, formatting, etc.); or iii) changes relationship. In these situations, the data model may be considered changed even if placeholder text is still displayed.

If the user switches to a new graphic and the new graphic's sample data model has additional levels in a branch, or additional siblings at any level, the user's data model may be fleshed out with sample data to create an ideal structure. (Stage 315.) The resulting data model may have more nodes than the sample data model, depending on the starting point. Except in the case of a single top-level node (see below), no nodes may be added between other nodes. In other words, all new nodes may be added at the end of the structure. This may be referred to as adding leaf nodes. (Stage 320.) Table 1 illustrates examples of graphics and their sample data models.

TABLE 1

| Process | Process with accents | Cycle | Hierarchy |
|---|---|---|---|
| [Text] | [Text] | [Text] | [Text] |
| [Text] | [Text] | [Text] | [Text] |
| [Text] | [Text] | [Text] | [Text] |
|  | [Text] | [Text] | [Text] |
|  | [Text] | [Text] | [Text] |
|  | [Text] |  | [Text] |
|  | [Text] |  |  |
|  | [Text] |  |  |
|  | [Text] |  |  |

Tables 2 and 3 are examples of user models and how sample data may be added. Sample data may be indicated by "[Text]".

TABLE 2

| User | Process with accents | Cycle | Hierarchy |
|---|---|---|---|
| First | First | First | First |
| Second | [Text] | Second | [Text] |
| Third | [Text] | Third | [Text] |
|  | Second | [Text] | [Text] |
|  | [Text] | [Text] | [Text] |
|  | [Text] |  | [Text] |
|  | Third |  | Second |
|  | [Text] |  | Third |
|  | [Text] |  |  |

TABLE 3

| User | Process with accents | Cycle | Hierarchy |
|---|---|---|---|
| First | First | First | First |
| Second | Second | Second | Second |
| Third | Third | Third | [Text] |
|  | [Text] | [Text] | [Text] |
|  | [Text] | [Text] | Third |
|  | [Text] | [Text] | [Text] |
|  | [Text] | [Text] |  |
|  | [Text] |  |  |
|  | [Text] |  |  |

If a graphic uses a single top-level node (stage 325), and none exists, (stage 330) a single node is added. In this case, all other nodes may become subordinate to the added node. (Stage 335.) If the user switches back to a graphic that does not require a single top-level node, and the single top-level node was created from the sample data (stage 340) (and has not been modified), then the single top-level node may be removed. (Stage 345.)

If, for example, the graphic's sample data model has fewer levels in a branch, or fewer siblings at any level, (stages 350 and 355) then trailing sample data nodes may be removed to "clean up" the graphic. (Stage 360.) A "pruned version" is illustrated in Table 4 below. The structure, however, may not be altered, so if a sample data node is between two non-sample data nodes within or between levels, that node may not be removed. (Stage 355.) Once this is complete, the graphic may be laid out. (Stage 365.)

TABLE 4

| Original Model | Pruned version |
| --- | --- |
| First | First |
| [Text] | [Text] |
| Second | Second |
| [Text] | |
| First | First |
| Second | Second |
| Third | Third |
| [Text] | |
| First | First |
|     [Text] |     [Text] |
|     Second |     Second |
|         [Text] | |
| First | First |
|     Second |     Second |
|         [Text] | |
|         [Text] | |

An embodiment consistent with the invention may comprise a system for providing multi-string placeholders. The system may comprise a memory storage and a processing unit coupled to the memory storage. The processing unit may be operative to display a plurality of text strings. Each of the plurality of text strings may be associated with each other and including placeholder text. The processing unit may be further operative to receive replacement text configured to replace the placeholder text corresponding to one of the plurality of the text strings. And the processing unit may be operative to update the displayed plurality of text strings, the displayed plurality of text strings displaying the received replacement text in the place of the placeholder text associated with the one of the plurality of text strings.

Another embodiment consistent with the invention may comprise a system for providing image placeholders. The system may comprise a memory storage and a processing unit coupled to the memory storage. The processing unit may be operative to display at least one image placeholder and at least one text string including placeholder text. Moreover, the processing unit may be operative to receive an image configured to replace the at least one image placeholder. And the processing unit may be operative to update the displayed at least one image placeholder, the received at least one image replacing the at least one image placeholder.

Yet another embodiment consistent with the invention may comprise a system for switching between graphic types. The system may comprise a memory storage and a processing unit coupled to the memory storage. The processing unit may be operative to display a first diagram configured to display data associated with a data model. The first diagram may have a first diagram type. Furthermore, the processing unit may be operative to receive a request to display the data model in a second diagram configured to display the data associated with the data model, the second diagram having a second diagram type. And the processing unit may be operative to display the second diagram configured to display the data associated with the data model.

Figure 5:
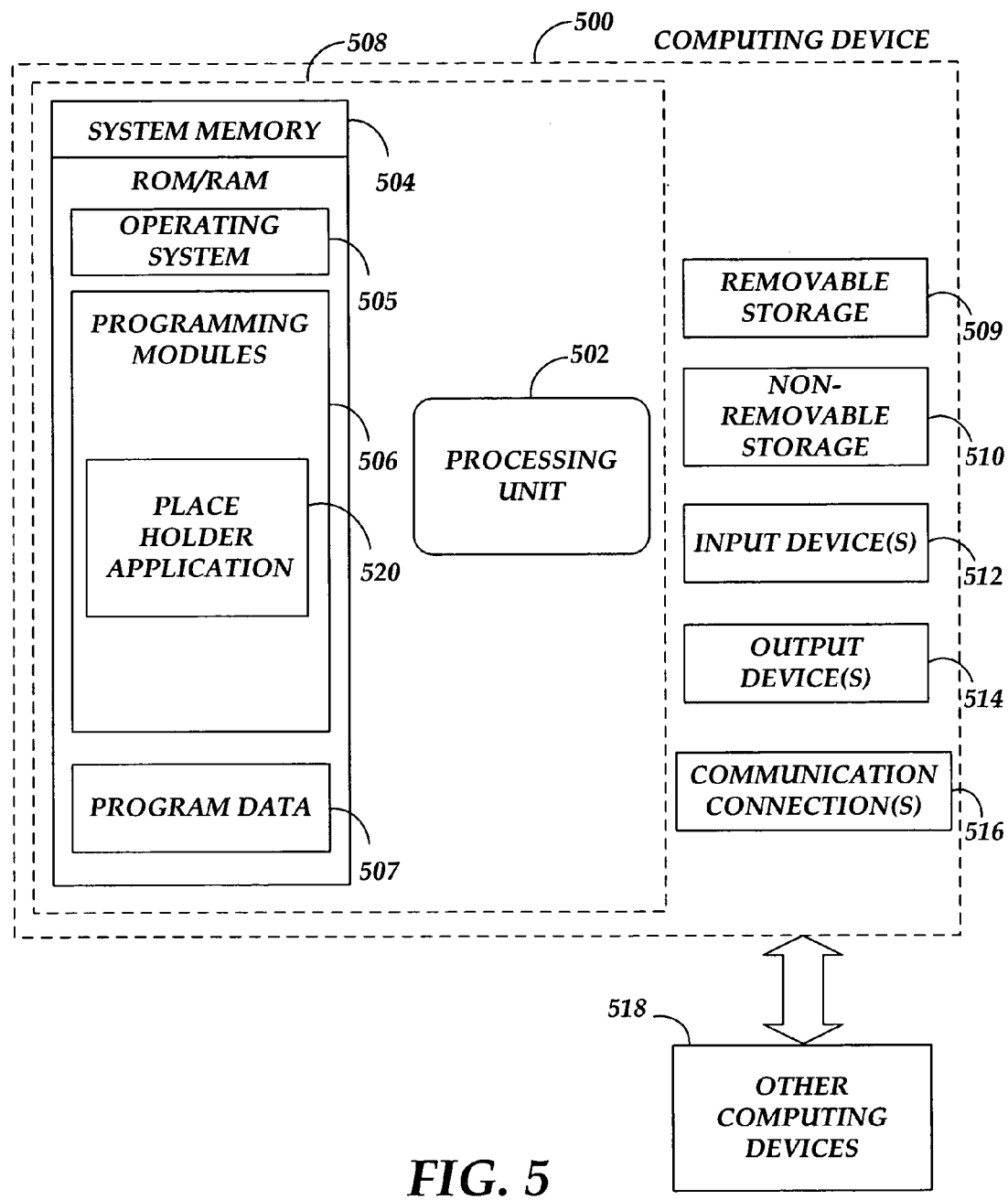
FIG. 5 is a block diagram of a system including a computing device.

FIG. 5 is a block diagram of system including a computing device 500. Consistent with embodiments of the invention, any of the aforementioned memory storages and processing units may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned computing devices are examples and other systems, devices, and processors may comprise the aforementioned memory storage and processing unit, consistent with embodiments of the invention.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include a placeholder application module 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, placeholder application module 520 may perform processes including, for example, those stated above or any one or more method 300 stages as described above. The aforementioned processes are examples, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing multi-string placeholders, the method comprising:

displaying data associated with a data model defining a plurality of elements and a semantic relationship with each of the plurality of elements, the data being configured to include a plurality of text strings associated with the plurality of elements and display at least one graphic associated with the data;

displaying the plurality of text strings in accordance with the data model, each of the plurality of text strings being associated with each other based on the semantic relationship indicated by the data model and including placeholder text as indicated by the data model, wherein displaying the plurality of text strings comprises displaying multiple placeholder segments associated with the placeholder text for each of the plurality of elements defined by the data model;

receiving replacement text configured to replace at least one of the multiple placeholder segments associated with the placeholder text corresponding to one of the plurality of the text strings; and updating the displayed plurality of text strings, wherein updating the displayed plurality of text strings comprises displaying the received replacement text in place of the at least one placeholder segment associated with the placeholder text corresponding to the one text string while preserving remaining placeholder segments associated with the placeholder text corresponding to the one text string.

2. The method of claim 1, wherein displaying the plurality of text strings comprises displaying the plurality of text strings within a first graphic.

3. The method of claim 1, wherein displaying the plurality of text strings comprises displaying the plurality of text strings within a first graphic, the first graphic being associated with at least one other graphic.

4. The method of claim 1, wherein displaying the plurality of text strings comprises displaying the plurality of text strings within a first graphic associated with one of the following diagram types: radial, hierarchical, and flat.

5. The method of claim 1, wherein displaying the plurality of text strings comprises displaying the plurality of text strings when an editor configured to display at least one textual placeholder is not in one of a slideshow mode and a reading mode.

6. The method of claim 1, further comprising displaying an image placeholder associated with the plurality of text strings.

7. A system for providing image placeholders, the system comprising:
   a memory storage; and
   a processing unit coupled to the memory storage, wherein the processing unit is operative to:
      display at least one shape associated with a data model defining a plurality of elements associated with the at least one shape and a semantic relationship with each of the plurality of elements, the least one shape being configured to include a plurality of text strings associated with the plurality of elements and display at least one graphic associated with the least one shape;
      display at least one image placeholder and at least one text string including multiple segments of placeholder text within the at least one shape, wherein each placeholder segment of the multiple segments of placeholder text is individually selectable, and wherein modification to one placeholder segment of the multiple segments of placeholder text within the at least one shape does not remove remain mg placeholder segments of the multiple segments of placeholder text;
      receive an image configured to replace the at least one image placeholder;
      update the displayed at least one image placeholder by replacing the at least one image placeholder with the received at least one image.

8. The system of claim 7, wherein the processing unit being operative to receive the image further comprises the processing unit being operative to present a user interface (UI) to a user, the UI configured to receive data indicating where the image is stored.

9. The system of claim 7, further comprising the processing unit being operative to receive replacement text configured to replace the placeholder text.

10. The system of claim 7, further comprising the processing unit being operative to receive replacement text configured to replace the placeholder text, the replacement text being associated with the received image.

11. The system of claim 7, wherein the processing unit being operative to display the at least one image placeholder further comprises the processing unit being operative to display the at least one image placeholder when editor configured to display the at least one image placeholder is not in one of a slideshow mode and a reading mode.

12. A computer-readable storage medium which stores a set of instructions which when executed performs a method for switching between graphic types, the method executed by the set of instructions comprising:
   displaying a first diagram configured to display data associated with a data model defining a plurality of elements and a semantic relationship with each of the plurality of elements, the first diagram having a first diagram type, wherein displaying the first diagram configured to display the data associated with the data model comprises:
   displaying a textual placeholder and an image placeholder in a shape associated with the first diagram, wherein displaying the textual placeholder in the shape associated with the first diagram comprises displaying multiple placeholder segments associated with the textual placeholder, each placeholder segment of the multiple placeholder segments being individual selectable, and
   displaying the data associated with the data model in the textual placeholder and the image placeholder in accordance with the data model, wherein the data associated with the data model is selectable; receiving a request to display the data model in a second diagram configured to display the data associated with the data model, the second diagram having a second diagram type, wherein receiving the request to display the data model in a second diagram configured to display the data associated with the data model comprises allowing a user to modify data associated with the data model; and
   displaying the second diagram configured to display the data associated with the data model, wherein displaying the second diagram configured to display the associated data comprises removing sample data nodes that are not between at least two non-sample data nodes.

13. The computer-readable storage medium of claim 12, wherein receiving the request to display the data model in the second diagram comprises receiving the request to display the data model in the second diagram comprising a first sample data model having one of the following: additional levels in a branch as compared to a second sample data model associated with the first diagram and additional siblings at any level as compared to the second sample data model associated with the first diagram.

14. The computer-readable storage medium of claim 12, wherein receiving the request to display the data model in the second diagram comprises receiving the request to display the data model in the second diagram comprising a first sample data model having one of the following: additional levels in a branch as compared to a second sample data model associated with the first diagram and additional siblings at any level as compared to the second sample data model associated with the first diagram.

15. The computer-readable storage medium of claim 12, wherein at least one of the first diagram type and the second diagram type comprises one of the following: radial, hierarchical, and flat.

16. The computer-readable storage medium of claim 12, further comprising switching between graphics supporting hierarchical and flat data sets, wherein at least one of a structure of the data model is maintained during the switch and the data associated with the data model is maintained during the switch.

17. The computer-readable storage medium of claim 12, further comprising adding a leaf node from a hierarchical tree describing a graphic layout structure while maintaining a semantic structure of the data model.

18. The computer-readable storage medium of claim 17, wherein adding the leaf node further comprises adding the leaf node based on determining that the data model includes more that one top level node.

19. The computer-readable storage medium of claim 12, further comprising pruning a leaf node from a hierarchical tree describing a graphic layout structure of the data model while maintaining a semantic structure of the data model.

20. The computer-readable storage medium of claim 12, wherein at least one of the first diagram and the second diagram includes at least one graphic having a plurality of text strings, each of the plurality of text strings being associated with each other and including placeholder text.

* * * * *